UNITED STATES PATENT OFFICE.

EDWARD J. DE SMEDT, OF WASHINGTON, DISTRICT OF COLUMBIA.

BITUMINOUS CEMENT.

SPECIFICATION forming part of Letters Patent No. 237,662, dated February 8, 1881.

Application filed January 11, 1881. (No specimens.)

*To all whom it may concern:*

Be it known that I, EDWARD J. DE SMEDT, of the city of Washington, District of Columbia, have invented certain new and useful Improvements in Bituminous Cements or Compositions used for Paving and other Purposes, of which the following is a specification.

My invention is directed to the treatment of what is commonly known as "heavy petroleum-oil," whether natural or resulting from the distillation of petroleum, the object being to bring this oil to the condition of an asphalt or oxygenated bitumen.

The invention has originated in the effort to cure certain defects noticeable in that class of pavements commonly known as "bituminous concrete" or "asphalt" or "bituminous" pavements, and it is directed chiefly to that end. It is, however, applicable generally to bituminous cements or compositions consisting, in whole or in part, of heavy petroleum-oils, used not only for paving but for other purposes.

The residuum which remains after the illuminating-oils known in the market as "kerosene-oils" have been distilled off from petroleum is now generally used in combination with asphaltum, &c., in the manufacture of asphalt paving-cement. This residuum is a compound of different hydrocarbon oils, chiefly paraffine; and the object of thus using it is to obtain a softer and less brittle cement than would be produced by asphalt alone. Owing, however, to the fact that the residuum is wanting in very important qualities—viz., adhesiveness, tensile strength, and impermeability, resulting from lack of affinity for moisture—pavements made of asphaltic cement in which the residuum is employed are liable to crack in winter and to become unduly soft in summer, and also greatly affected by moisture or water. I have discovered that by subjecting this residuum, and indeed heavy petroleum-oil generally, to the treatment hereinafter described, I obtain a material which, in all physical characteristics, so far as I have been able to ascertain, resembles an asphaltic product; or, in other words, to all practical intents and purposes, I transform heavy petroleum-oil into an asphalt, imparting to it impermeability to moisture, adhesiveness, and tensile strength, and putting it in a condition in which it ceases to be liable to appreciable evaporation or oxidation under the natural influences to which it or the cement or composition of which it is a component part may be subjected during its period of use.

The principal feature of my invention consists in subjecting, while in a heated condition, heavy petroleum-oils, whether natural or artificial—by which term I intend the residuum of distillation of petroleum after the illuminating or kerosene oils have been distilled off, in contradistinction to a natural heavy petroleum, such as some oils obtained in Canada and other localities—to the action of an oxidizing agent, or an agent which will readily give up its oxygen to said products when brought into contact with it under such conditions. By this means I more or less completely oxidize the said product, preliminary to using it in a cement or bituminous composition. And a further feature of my invention consists in submitting said oil, after its treatment with the oxidizing agent, to a still higher heat, in order to evaporate or drive off volatile substances—some pre-existent in the oil and others formed by and during the oxidizing process—and also some oils not oxidized, in order to obtain a thoroughly homogeneous product, which product, after this treatment, has all the physical characteristics and properties of an asphalt, so far as I have been able to determine.

I will now proceed to describe more in detail the preferred mode of operation which I follow, and also the preferred oxidizing agent employed by me.

The heavy petroleum-oil is placed in a suitable tank or vessel, and is there heated to, say, about 250° Fahrenheit. While in this heated condition I gradually and thoroughly mix into the mass the oxidizing agent—for instance, permanganate of potash, or preferably permanganic acid, $(Mn_2O_7,)$ or picric acid, $(C_{12}H_2(NO_4)_3OHO.)$ Either one of these agents gives up its oxygen freely to the heated petroleum-oil, and thus oxidizes the latter more or less completely, according to the proportion of acid used. I find that for all practical purposes three hundred grams of the oxidizing agent to one ton of the heavy petroleum is a sufficient quantity; and practically the oxidizing process is completed in from a quarter to half an hour. After the oxidation is effected I then raise the temperature of the oxidized product to about 500° Fahrenheit. A small percentage of volatile substance is formed by and during the oxidizing process, and in order to drive off these as well as other volatile substances pre-existent with the petroleum, and also some oils not oxidized, I heat the oil to the degree stated and maintain it at this heat until said substances are in great measure, if not entirely, eliminated from the mass. It will suffice for the purpose to maintain the mass thus heated for, say, about one hour. The said evaporated substance so driven off can be collected and condensed and have some value. The mass of the petroleum, however, has by the treatment been transformed into a homogeneous, or practically homogeneous, oxidized bitumen, and is now ready for use as a cement for asphaltic pavements, alone or in combination with other bitumens, to be mixed with sand and other mineral substances. The said product possesses great tenacity and tensile strength, and renders the asphaltic preparation or cement in which it is used less brittle and less liable to be affected by air or water.

It is not necessary, nor indeed desirable, to entirely oxidize the petroleum-oil, except, perhaps, when it is used alone and not in combination with other asphalts.

The oxidized petroleum product herein described, although designed particularly for use in making bituminous pavements, can also be employed in the manufacture of cements or compositions for roofing, coating various things, &c.

The proportion of the oxidizing agent employed may vary to some extent; and as regards this agent I would remark that there are some acids—such as sulphuric and chromic—which, while they may give up their oxygen to some extent, nevertheless have a destructive effect, acting to decompose the petroleum and to give up oxygen to the constituent elements of the latter, and not merely to oxidize the material itself, leaving it otherwise unchanged. Such agents manifestly are unsuitable for the purposes of my invention.

What I claim, and desire to secure by Letters Patent, is—

1. The improvement in the art of preparing heavy petroleum-oil for use in bituminous cements and compositions for paving and other purposes which consists in subjecting said products, while in heated condition, to the action of an oxidizing agent, substantially as hereinbefore set forth.

2. The process of treating heavy petroleum-oils which consists in subjecting said products, while heated, to the action of an oxidizing agent, and subsequently subjecting the product thus treated to still higher heat, substantially as and for the purposes hereinbefore set forth.

3. The herein-described method of treating heavy petroleum-oils, whether natural or artificial, for the conversion of the same into a homogeneous asphalt product, consisting in subjecting the same, while maintained at a temperature of 250° Fahrenheit, or thereabout, to the action of an oxidizing agent, and subsequently raising the temperature of the mass to 500° Fahrenheit, or thereabout, there maintaining it for a proper length of time, substantially as and for the purposes hereinbefore set forth.

4. The oxidized petroleum product hereinbefore described.

In testimony whereof I have hereunto set my hand this 10th day of January, 1881.

E. J. DE SMEDT.

Witnesses:
E. A. DICK,
N. C. LANE.